US009951469B2

(12) United States Patent
Seynhaeve et al.

(10) Patent No.: US 9,951,469 B2
(45) Date of Patent: Apr. 24, 2018

(54) STEEL CORD FOR RUBBER REINFORCEMENT

(71) Applicant: NV BEKAERT SA, Zwevegem (BE)

(72) Inventors: Geert Seynhaeve, Zwevegem (BE); Stijn Himpe, Landegem (BE); Guy Buytaert, Sint-Gillis-Waas (BE)

(73) Assignee: NV BEKAERT SA, Zwevegem (BE)

( * ) Notice: Subject to any disclaimer, the term of this patent is extended or adjusted under 35 U.S.C. 154(b) by 475 days.

(21) Appl. No.: 14/416,769

(22) PCT Filed: Jun. 5, 2013

(86) PCT No.: PCT/EP2013/061527
§ 371 (c)(1),
(2) Date: Jan. 23, 2015

(87) PCT Pub. No.: WO2014/016028
PCT Pub. Date: Jan. 30, 2014

(65) Prior Publication Data
US 2015/0184335 A1     Jul. 2, 2015

(30) Foreign Application Priority Data

Jul. 24, 2012   (EP) .................................... 12177577

(51) Int. Cl.
| | |
|---|---|
| *D07B 1/06* | (2006.01) |
| *B60C 9/00* | (2006.01) |
| *D02G 3/12* | (2006.01) |
| *D02G 3/48* | (2006.01) |

(52) U.S. Cl.
CPC .............. *D07B 1/06* (2013.01); *B60C 9/0007* (2013.01); *D02G 3/12* (2013.01); *D02G 3/48* (2013.01); *D07B 1/062* (2013.01); *D07B 1/0666* (2013.01); *B60C 2009/0014* (2013.01); *D07B 2201/2011* (2013.01); *D07B 2201/2029* (2013.01); *D07B 2201/2036* (2013.01); *D07B 2201/2037* (2013.01); *D07B 2201/2065* (2013.01); *D07B 2201/2098* (2013.01); *D07B 2205/3071* (2013.01); *D07B 2205/3089* (2013.01); *D07B 2501/2076* (2013.01)

(58) Field of Classification Search
CPC ........ D07B 1/06; D07B 1/062; D07B 1/0666; B60C 9/0007
USPC .................... 57/217, 223, 232, 221
See application file for complete search history.

(56) References Cited

U.S. PATENT DOCUMENTS

| | | | |
|---|---|---|---|
| 2,240,805 A | 5/1941 | Semon | |
| 2,500,810 A | 3/1950 | Fink | |
| 2,792,868 A * | 5/1957 | Benson ................. | B60C 9/0007 152/153 |
| 3,391,531 A * | 7/1968 | Riggs ..................... | D07B 1/167 57/206 |
| 3,846,160 A | 11/1974 | Hirakawa | |
| 3,961,740 A | 6/1976 | Nakamoto et al. | |
| 4,189,332 A | 2/1980 | Rye et al. | |
| 4,255,496 A * | 3/1981 | Haemers ................. | C23C 30/00 152/565 |
| 4,265,678 A * | 5/1981 | Hachisuka ............ | B21C 37/042 148/517 |
| 4,269,645 A | 5/1981 | Shemenski, Sr. | |
| 4,269,877 A | 5/1981 | Shemenski, Sr. | |
| 4,283,460 A | 8/1981 | Shemenski, Sr. | |
| 4,347,290 A | 8/1982 | Haemers | |
| 4,446,198 A | 5/1984 | Shemenski et al. | |
| 4,488,587 A * | 12/1984 | Umezawa ............. | B60C 9/0007 152/451 |
| 4,543,298 A * | 9/1985 | Riedl ..................... | D07B 1/062 428/592 |
| 4,545,834 A | 10/1985 | Shemenski et al. | |
| 4,572,264 A * | 2/1986 | Umezawa ............. | B60C 9/0007 152/451 |
| 4,651,513 A * | 3/1987 | Dambre .................. | C21D 8/06 152/451 |
| 4,704,337 A * | 11/1987 | Coppens .................... | C08J 5/06 152/451 |
| 4,765,917 A | 8/1988 | Otaki et al. | |
| 4,788,815 A * | 12/1988 | Umezawa ............. | D07B 1/062 57/212 |
| 5,050,657 A * | 9/1991 | Umezawa ............. | D07B 1/062 152/451 |
| 5,118,367 A | 6/1992 | Starinshak | |
| 5,321,941 A * | 6/1994 | Bollen .................. | B60C 9/0007 152/451 |

(Continued)

FOREIGN PATENT DOCUMENTS

| | | |
|---|---|---|
| EP | 0 175 632 A1 | 3/1986 |
| EP | 0 257 667 A1 | 3/1988 |

(Continued)

OTHER PUBLICATIONS

Annonymous: "Micro-alloyed steel cord constructions for tyres", Mason Publications, vol. 349, No. 84, (May 1, 1993) 25 pgs.
Anonymous, High Durable Steel Cord Reinforced Rubber Tire, Research Disclosure, vol. 274, No. 36, Feb. 1, 1987, 2 pages, Mason Publications, Hampshire, GB.
Letter of Douglas Holtz of Jul. 16, 2015 (2 pages).
Sébastien Hollinger et al., Wear Mechanism of Tungsten carbide dies during wet drawing of Steel Tyre Cords, WEAR, vol. 255, No. 7-12, Aug. 1, 2003, pp. 1291-1299.
USPTO Office Action, U.S. Appl. No. 14/375,295, dated Feb. 23, 2017, 9 pages.
USPTO Office Action, U.S. Appl. No. 14/375,295, dated May 30, 2017, 21 pages.

(Continued)

*Primary Examiner* — Shaun R Hurley
*Assistant Examiner* — Bao-Thieu L Nguyen
(74) *Attorney, Agent, or Firm* — Foley & Lardner LLP

(57) ABSTRACT

A steel cord with two or more filaments possibly including a wrapping filament, at least one but not all of the two or more filaments including the possible wrapping filament is coated with a ternary or quaternary alloy coating of copper-M-zinc. The steel cord with lower cost and good adhesion performance is for reinforcing rubber product.

14 Claims, No Drawings

(56) References Cited

U.S. PATENT DOCUMENTS

| | | | | |
|---|---|---|---|---|
| 5,323,596 | A | * | 6/1994 | Nguyen .............. B60C 9/0007 152/527 |
| 5,498,351 | A | | 3/1996 | Hefling |
| 5,526,864 | A | * | 6/1996 | Kuriya ................ B60C 9/0007 152/451 |
| 5,687,557 | A | * | 11/1997 | De Vos ............... B60C 9/0007 57/200 |
| 5,697,204 | A | * | 12/1997 | Kuriya ................ B60C 9/0007 57/213 |
| 5,843,583 | A | * | 12/1998 | D'Haene .............. D07B 1/062 152/451 |
| 5,878,564 | A | * | 3/1999 | De Vos ............... B60C 9/0007 57/11 |
| 6,150,308 | A | | 11/2000 | Deruyck et al. |
| 6,203,932 | B1 | | 3/2001 | Hisakatu |
| 6,691,758 | B2 | * | 2/2004 | Kim .................... B60C 9/0007 152/451 |
| 6,811,877 | B2 | * | 11/2004 | Haislet ................. D02G 3/48 152/451 |
| 6,863,103 | B1 | * | 3/2005 | Masubuchi .......... B60C 9/0007 152/451 |
| 7,089,723 | B2 | * | 8/2006 | Vanneste ............. D07B 1/0633 57/212 |
| 7,152,391 | B2 | * | 12/2006 | Vanneste ............. B60C 9/0007 57/237 |
| 7,162,902 | B2 | | 1/2007 | Oosawa et al. |
| 7,963,093 | B2 | * | 6/2011 | Vanderbeken ....... D07B 1/0613 57/223 |
| 8,863,490 | B2 | * | 10/2014 | Boisseau .............. D07B 1/0613 57/223 |
| 8,899,007 | B2 | * | 12/2014 | Cheng ................. D07B 1/0613 57/237 |
| 2002/0103089 | A1 | | 8/2002 | Fukushima et al. |
| 2005/0051251 | A1 | * | 3/2005 | Sinopoli .............. B60C 9/0007 152/556 |
| 2006/0237110 | A1 | | 10/2006 | Barguet et al. |
| 2010/0170215 | A1 | * | 7/2010 | Nishimura ........... D07B 1/0613 57/258 |
| 2012/0177944 | A1 | | 7/2012 | Toyosawa |
| 2014/0378597 | A1 | * | 12/2014 | Buytaert .............. D07B 1/0666 524/440 |
| 2015/0017467 | A1 | * | 1/2015 | Buytaert ............... B21C 9/02 428/625 |

FOREIGN PATENT DOCUMENTS

| | | |
|---|---|---|
| EP | 0 314 230 A1 | 5/1989 |
| EP | 0 382 273 A1 | 8/1990 |
| EP | 1 067 236 A2 | 1/2001 |
| EP | 2 268 839 | 9/2009 |
| GB | 1 466 114 A | 3/1977 |
| GB | 2 076 320 A | 12/1981 |
| JP | 55-071887 A | 5/1980 |
| JP | 56-096977 A | 8/1981 |
| JP | 62-288634 A | 12/1987 |
| JP | 01-113232 A | 5/1989 |
| JP | 01-113234 A | 5/1989 |
| JP | 06-049783 A | 2/1994 |
| JP | 2001-234371 A | 8/2001 |
| JP | 2005-246447 A | 9/2005 |
| JP | 2006-028651 A | 2/2006 |
| JP | 2010-280928 A | 12/2010 |
| JP | 2011-147994 A | 8/2011 |
| JP | 2011-219837 A | 11/2011 |
| JP | 2012-012625 A | 1/2012 |
| WO | WO 2011/076746 A1 | 6/2011 |

OTHER PUBLICATIONS

USPTO Office Action, U.S. Appl. No. 14/375,567, dated Mar. 9, 2017, 10 pages.

USPTO Office Action, U.S. Appl. No. 14/375,567, dated Jun. 1, 2017, 29 pages.

W. J. Van Ooij, Mechanism and Theories of Rubber Adhesion to Steel Tire Cords—An Overview, Rubber Chemistry and Technology, Jan. 1, 1984, pp. 421-456, vol. 57.

USPTO Office Action, U.S. Appl. No. 14/375,295, dated Sep. 19, 2017, 20 pages.

USPTO Office Action, U.S. Appl. No. 14/375,567, dated Sep. 19, 2017, 10 pages.

USPTO Office Action, U.S. Appl. No. 14/375,567, dated Dec. 27, 2017, 13 pages.

USPTO Advisory Action, U.S. Appl. No. 14/375,295, dated Dec. 6, 2017, 9 pages.

USPTO Office Action, U.S. Appl. No. 14/375,295, dated Jan. 18, 2018, 29 pages.

* cited by examiner

STEEL CORD FOR RUBBER REINFORCEMENT

TECHNICAL FIELD

The present invention relates to a steel cord. The present invention also relates to a use of the steel cord being as rubber reinforcement.

BACKGROUND ART

Steel cords consisting of brass coated filaments are widely used to reinforce rubber products such as tires, conveyer belts and hydraulic hoses. In order to have a good adhesion performance and to reduce the rate of degradation of adhesion, particularly due to ageing in hot humid conditions, cobalt complexes are added to the rubber compound. However cobalt is considered to be a poison for the rubber since, like most transition metals, it is an oxidation catalyst. As a result, oxidation of diene rubber molecules is accelerated, which leads to early rubber ageing. Moreover, cobalt also speeds up crack growth rate of the rubber.

In addition to the above disadvantage there is also the following problem: Cobalt is a strategic material and it is quite expensive. By adding cobalt to the whole rubber compound, one adds too much cobalt since it has only a positive function at the brass surface. Generally, it is considered that only 20% of the cobalt added to the rubber is used effectively.

The prior art has already recognized one or more of these problems. A lot of attempts have been made to concentrate the cobalt there where it belongs, namely in or on the coating of the steel wires or steel cords.

U.S. Pat. No. 2,240,805 attempts to completely replace the brass coating by a pure cobalt coating on articles for reinforcing rubber.

U.S. Pat. No. 4,255,496 discloses the use of a ternary alloy copper-cobalt-zinc coating instead of a binary alloy copper-zinc (=brass) coating. With this ternary alloy coating, the rate of bond degradation due to aging in hot humid conditions can be significantly reduced.

U.S. Pat. No. 4,265,678 teaches the use of a ternary alloy copper-zinc-cobalt coating with excellent drawability and adhesion properties.

GB 2076320 teaches a thin layer of cobalt on top of a brass coating followed by a wire drawing so that there in a high gradient of cobalt on top of the brass coating.

EP 0175632 teaches a quaternary alloy coating copper-zinc-nickel-cobalt on steel elements.

WO2011/076746 discloses a steel cord with a ternary or quaternary alloy coating and with a zinc gradient. Although giving improvement with respect to adhesion, this zinc gradient involves a post-treatment of the wire or cord, meaning an extra operation step in the process.

U.S. Pat. No. 4,651,513 discloses a steel cord that has a multi-layered structure, the wires in the surface layer are covered with a rubber adherable coating, such as brass, while the wires in the layer inwardly adjacent the surface layer are covered by a corrosion resistance coating, such as zinc coating or zinc alloy coating.

DISCLOSURE OF INVENTION

It is an object of the present invention to provide a steel cord with good adhesion property and lower cost.

It is another object of the present invention to provide a steel cord which helps to reduce the environment pollution of the rubber product.

It is a further object of the present invention to provide a use of the steel cord as a rubber reinforcement.

According a first aspect of the invention, a steel cord with two or more filaments possibly including a wrapping filament is provided, wherein at least one but less than all of the filaments of the steel cord including the possible wrapping filament is coated with a ternary or quaternary alloy coating of copper-M-zinc, M is one or two metals selected out of the group consisting of cobalt, nickel, tin, indium, manganese, iron, bismuth and molybdenum, the copper has a content inside the ternary or quaternary alloy coating ranging from 58 weight percent to 75 weight percent, the M has a content inside the ternary or quaternary alloy coating ranging from 0.5 weight percent to 10 weight percent, the remainder of the ternary or quaternary alloy coating are zinc and unavoidable impurities.

The inventor is surprised to find that the invention steel cord performs quite well on the adhesion to the rubber compound, especially to the cobalt-free rubber compound. Compared with the prior steel cord consisting of the filaments all of which are coated with the ternary or quaternary alloy coating of copper-M-zinc, the invention steel cord has a similar or almost the same adhesion performance to the cobalt-free rubber compound. To the invention steel cord, the number of the filaments which are coated with the ternary or quaternary alloy coating of copper-M-zinc is reduced, but such a reduction does not influence the adhesion performance of the steel cord so much. As a result, the production cost of steel cord is reduced and the adhesion property of steel cord is kept, and the invention steel cord with enough adhesion property can be applied to reinforce the rubber product. In particular, when M is cobalt, the production cost of the steel cord is quite reduced because cobalt is a strategic material and quite expensive, the invention steel cord helps to reduce the amount of cobalt therefore reduces the production cost while keeping a good adhesion performance. Furthermore, to the rubber product reinforced by the invention steel cord, the rubber can be a cobalt-free rubber material, so the invention steel cord helps to reduce or even avoid the environment pollution which is caused by the used rubber product because of the absence of cobalt.

According to the present invention, 'at least one but less than all of the filaments of the steel cord including the possible wrapping filament is coated with a ternary or quaternary alloy coating of copper-M-zinc' means: at least one of the filaments of the steel cord is a filament coated with the ternary or quaternary alloy coating of copper-M-zinc, and at least one of the filaments of the steel cord is a filament not coated with the ternary or quaternary alloy coating of copper-M-zinc. The invention steel cord is a hybrid steel cord by combining at least two kinds of steel filaments, wherein at least two kinds of steel filaments have different metal coatings.

To the present invention, 'a steel cord with two or more filaments possibly including a wrapping filament' means the steel cord may have a wrapping filament or not.

To the ternary or quaternary alloy coating of copper-M-zinc, when M is selected to be one metal, the coating is so-called 'ternary alloy coating'; when M is selected to be two metals, the coating is so-called 'quaternary alloy coating'. A method of applying the ternary or quaternary alloy coating is applying the metal coatings one by one, for example, applying a copper coating on the surface of the filament, then applying a cobalt coating on the surface of the copper coating, finally applying a zinc coating on the surface of the cobalt coating, followed by a thermal diffusion treatment. However, the formulation 'copper-M-zinc' does not limit the position of each metal coating, and that means the M coating is not limited to be between the copper coating and the zinc coating, actually the M coating may also be applied before or after the copper coating and the zinc coating.

The ternary or quaternary alloy coating of copper-M-zinc provides a long-term adhesion performance to the steel cord while reinforcing rubber product. Preferably, the ternary or quaternary alloy coating of copper-M-zinc may further comprise phosphorus and/or triazole. The ternary or quaternary alloy coating of copper-M-zinc added with phosphorus and/or triazole has an improved adhesion property.

According to the present invention, preferably, the steel cord comprises filaments coming in contact with rubber after embedding the steel cord in rubber and filaments not coming in contact with rubber after embedding the steel cord in rubber in a typical vulcanisation process, at least 50% of the filaments coming in contact with rubber after embedding the steel cord in rubber are coated with the ternary or quaternary alloy coating of copper-M-zinc. The inventor is surprised to find that only the filaments coming in contact with rubber contribute to the adhesion force between rubber and cord, the filaments not coming in contact with rubber do not contribute to the adhesive force between rubber and cord. The invention steel cord in which at least 50% of the filaments coming in contact with rubber after embedding the steel cord in rubber are coated with the ternary or quaternary alloy coating of copper-M-zinc can provide enough adhesive force between rubber and cord. The terms "filaments coming in contact with rubber in a typical vulcanisation process" mean that the filaments are exposed to the neighbourhood. This is the case with outer filaments. This is also the case with inner filaments which can be reached from the neighbourhood via a path that is sufficiently broad to allow travelling of rubber. A path with a width ranging from 0.010 mm to 0.075 mm or more may be sufficient.

More preferably, all of the filaments coming in contact with rubber after embedding the steel cord in rubber are coated with the ternary or quaternary alloy coating of copper-M-zinc.

According to the present invention, besides the filaments which are coated with the ternary or quaternary alloy coating of copper-M-zinc, the remainder filaments of the steel cord are preferably selected from the group consisting of brass coated wire, zinc coated wires or uncoated wires. More preferably, the remainder filaments are brass coated wires or zinc coated wires, as the brass coated wires or the zinc coated wires can provide a short-term adhesion performance which is also important while applying the steel cord to reinforce the rubber product, i.e. a rubber tire, and the combination of adhesion performances, short-term and long-term, will improve the lifetime of the rubber product which is embedded with the invention steel cord.

According to the first preferable embodiment of the present invention, the steel cord has a multi-layered structure comprising at least a core layer and an outer layer, the core layer comprises at least one filament and the outer layer comprises a number of filaments, wherein at least 50% of the filaments in the outer layer are coated with the ternary or quaternary alloy coating of copper-M-zinc, and not all of the filaments of the steel cord are coated with the ternary or quaternary alloy coating of copper-M-zinc.

Inventor is surprised to find that the above first preferable embodiment provides a lower production cost but without a substantial adhesion performance loss compared with the existing steel cord which is consisting of the filaments being coated with the ternary or quaternary alloy coating. According to the adhesion performance test, the first preferable embodiment provides a similar or almost the same adhesion performance as the existing steel cord.

To the first preferable embodiment, more preferably, at least 70% of the filaments in the outer layer are coated with the ternary or quaternary alloy coating of copper-M-zinc. Most preferably, all of the filaments in the outer layer are coated with the ternary or quaternary alloy coating of copper-M-zinc, as this provides almost the same adhesion performance as the prior existing steel cord.

To the first preferable embodiment, preferably, the remainder of filaments in the outer layer are alternated with the filaments coated with the ternary or quaternary alloy coating of copper-M-zinc. Thus the adhesion ability can be uniformly distributed on the outer surface of the steel cord.

According to the first preferable embodiment, the steel cord further comprises one or more inner layers between the core layer and the outer layer, the one or more inner layer comprises a number of filaments, the filaments in the one or more inner layers are selected from the group consisting of brass coated wires, zinc coated wires, the ternary or quaternary alloy of copper-M-zinc coated wires or uncoated wires. To this invention steel cord with at least three layers, preferably, the filaments in the inner layer and the filaments in the outer layer are coated with the ternary or quaternary alloy coating of copper-M-zinc, and the filaments in the core layer is not coated with the ternary or quaternary alloy coating of copper-M-zinc. This preferable invention provides a lower cost while keeping the adhesion performance compared with the existing steel cord.

According to the second preferable embodiment of the present invention, the steel cord has a multi-layered structure comprising at least a core layer and an outer layer, the core layer comprises at least one filament and the outer layer comprises a number of filaments, and at least 50% of the filaments in the core layer are coated with a ternary or quaternary alloy coating of copper-M-zinc, and not all of the filaments in the steel cord are coated with the ternary or quaternary alloy coating of copper-M-zinc.

To the second preferable embodiment, preferably, when the filaments in the core layer have a number more than one, the remainder of the filaments in the core layer are alternated with the filaments coated with the ternary or quaternary alloy coating of copper-M-zinc for better and more uniformly adhesion performance.

To the second preferable embodiment, preferably, the outer layer is unsaturated, and it means that there are gaps or openings between the adjacent filaments in the outer layer, thereby the rubber material can penetrate into the core layer very easily while embedding the invention steel cord into the rubber. Compared with the invention steel cord in which the outer layer is not unsaturated, the steel cord with an unsaturated outer layer has a better adhesion performance to the rubber material, because the rubber material can penetrate into the center of the steel cord much easier, and thereby the contact area between the filaments in core layer coated with the ternary or quaternary alloy coating of copper-M-zinc and the rubber material is increased. The filaments in the steel cord or in the outer layer at least may be pre-formed before being twisted to be a steel cord, i.e. two dimensional wavy pre-formed or three dimensional spiral pre-formed, for forming the gaps or opening.

To the second preferable embodiment, preferably, all of the filaments in core layer are coated with the ternary or quaternary alloy coating of copper-M-zinc.

According to the first preferable embodiment and the second preferable embodiment, the steel cord may have a wrapping filament, and the wrapping filament may be coated with the ternary or quaternary alloy coating of copper-M-zinc or not.

According to the third preferable embodiment of the present invention, the steel cord comprises a wrapping filament, only the wrapping filament is not coated with the ternary or quaternary alloy coating of copper-M-zinc and the remainder filaments of the steel cord are coated with the ternary or quaternary alloy coating of copper-M-zinc.

According to the present invention, the structure of the steel cord may be any one of the structure known in the art, for example, 3×1, 4×1, 5×1, 6×1, 7×1, 12×1, 16×1, 19×1, 27×1, 1+5, 1+6, 1+7, 1+8, 2+5, 2+6, 2+7, 2+8, 2+9, 3+5, 3+6, 3+7, 3+8, 3+9, 4+6, 4+7, 4+8, 4+9, 4+10, 1+6+12, 2+7+12, 2+7+13, 3+9+15, 3+9+1, 3+9+15+1. The steel cord may be a compact cord or an open cord. The diameter of the filaments in the steel cord may be the same or different. Especially to the multi-layered steel cord, the filament in the core layer may have the bigger diameter than the filament in the outer layer thereby provides a better rubber penetration performance.

The steel cord may also be a multi-strand cord of the general type m×n, where m is the number of strands and n is the number of filaments per strand or of the type k×l+m×n. Typical examples are 7×4, 7×7, 7×19, 7×31. These multi-strand steel cord constructions may be used in conveyor belts and in off-the-road tires.

According to another aspect of the present invention, a use of a steel cord as a rubber reinforcement is provided. The steel cord can be used for reinforcing rubber product, and the rubber product can be any one of the known rubber product, i.e. rubber tire, rubber hose or rubber belt. Preferably, the rubber compound of the rubber product is a cobalt-free rubber.

MODE(S) FOR CARRYING OUT THE INVENTION

The present invention relates to several kinds of steel filaments, uncoated filament, brass coated filament, zinc coated filament, or ternary or quaternary alloy coating of copper-M-zinc coated filament. To these kinds of steel filament, the filament diameter is from 0.05 mm to 0.60 mm. Examples of filament diameters are 0.10 mm, 0.12 mm, 0.15 mm, 0.175 mm, 0.18 mm, 0.20 mm, 0.22 mm, 0.245 mm, 0.28 mm, 0.30 mm, 0.32 mm, 0.35 mm, 0.38 mm, 0.40 mm. All these kinds of steel filaments are obtained by drawing a steel filament from a diameter of 1.0 mm to 2.5 mm till the final desired diameter.

When the filament is drawn directly without any coating or plating process, an uncoated steel filament is obtained.

When the filament is subjected to an electroplating process of copper and zinc or zinc only before drawing, a brass coated or zinc coated filament is obtained.

When the filament is subjected to a coating process as follows before drawing, a ternary alloy coating of copper-M-zinc coating is obtained;

i) pickling in a $H_2SO_4$ solution to clean the surface of the steel wire;

ii) electroplating with copper from a $Cu_2P_2O_7$ solution; solution contains 25 g/l copper and 180 g/l pyrophosphate;

iii) electroplating with zinc from a $ZnSO_4$ solution; solution contains 50 g/l zinc;

iv) electroplating M, i.e. cobalt or nickel, from a solution containing M, i.e. $CoSO_4$ or $NiSO_4$, solution contains 40 g/l M;

v) applying a thermal diffusion process to create the ternary alloy coating of copper-M-zinc.

If one more electroplating M process of step iv) in the above coating process is applied, a quaternary alloy coating of copper-M-zinc is obtained.

To the above coating process of the ternary or quaternary alloy coating of copper-M-zinc, the sequence of the steps ii), iii) and iv) can be changed freely according to the requirement of the coating. For example, when one metal coating is desired to be the outer surface of the ternary or quaternary alloy coating, the metal is electroplated in the last electroplating step; when one metal coating is desired to contact with the bare steel filament, the metal is electroplated in the first electroplating step.

The invention steel cord is manufactured by combining the filament which is coated with the ternary or quaternary alloy coating of copper-M-zinc and the filament which is not coated with the ternary or quaternary alloy coating of the copper-M-zinc together.

A first embodiment is a steel cord having a structure of 3+9. The cord is made by twisting 3 filaments to be a core layer firstly and then twisting 9 filaments around the core layer to be an outer layer. The 9 filaments in the outer layer are coated with a ternary alloy coating of copper-cobalt-zinc, and the 3 filaments in the core layer are coated with brass.

A second embodiment is a steel cord with a structure of 3+9+15. The steel cord is made by twisting 3 filaments to be a core layer, and then twisting 9 filaments around the core layer to be an inner layer, and finally twisting 15 filaments around the inner layer to be an outer layer. The 15 filaments in the outer layer and the 9 filaments in the inner layer are coated with a ternary alloy coating of copper-cobalt-zinc, and the 3 filaments in the core layer are coated with brass.

A third embodiment is a steel cord with a structure of 2+7. The steel cord is made by twisting 2 filaments as a core layer, and then twisting 7 filaments around the core layer to be an outer layer. 4 of the 7 filaments in the outer layer are coated with the ternary alloy coating of copper-cobalt-zinc, and the remainder filaments of the steel cord are coated with brass. In the outer layer, the 4 filaments coated with the ternary alloy coating of copper-cobalt-zinc are alternated with the 3 filaments coated with brass which means the filaments at the right and left side of the filament coated with brass are copper-cobalt-zinc coated filaments.

A fourth embodiment is a steel cord with a structure of 2+7+12. The steel cord is made by twisting 2 filaments as a core layer firstly, and then twisting 7 filaments around the core layer to be an inner layer, and finally twisting 12 filaments around the inner layer to be an outer layer. The 12 filaments in the outer layer and the 7 filaments in the inner layer are coated with a ternary alloy coating of copper-nickel-zinc, and the 2 filaments in the core layer are zinc coated filaments.

A fifth embodiment is a 6×1 open cord. The steel cord is made by twisting 6 filaments together. 3 of the 6 filaments are coated with a quaternary alloy coating of copper-cobalt-nickel-zinc, and the remainder filaments of the steel cord are uncoated filaments.

A sixth embodiment is a steel cord with a structure of 4+6. The steel cord is made by twisting 4 filaments as a core layer firstly and then twisting 6 filaments around the core layer to be an outer layer. The 6 filaments in the outer layer are zinc coated filaments and the 4 filaments in the core layer are coated with ternary alloy coating of copper-tin-zinc. The outer layer has gaps between the adjacent filaments.

A seven embodiment is a steel cord with a structure of 3+9+1. The steel cord is made by twisting 3 filaments as a core layer first, and then twisting 9 filaments around the core layer as an outer layer, and finally twisting 1 filament around the outer layer to be a wrapping filament. The wrapping filament and the 3 filaments in the core layer are brass coated filaments, and 9 filaments in the outer layer are coated with a ternary alloy coating of copper-cobalt-zinc.

An eighth embodiment is a steel cord with a structure of 1+6+1. The steel cord is made by arranging 1 filament as a core layer first, and then twisting 6 filaments around the core layer as an outer layer, and finally twisting 1 filament around the outer layer to be a wrapping filament. The 1 filament in the core layer and the 6 filaments in the outer layer are coated with a ternary alloy coating of copper-indium-zinc, and the wrapping filament is coated with zinc.

A ninth embodiment is a 16×1 compact steel cord. The steel cord is made by twisting 16 filaments together. 12 of the 16 filaments are coated with a ternary alloy coating of copper-bismuth-zinc, and the remainder filaments are uncoated filaments.

A tenth embodiment is a 2+7+13 steel cord. The steel cord is made by twisting 2 filaments firstly to be a core layer, then twisting 7 filaments around the core layer to be an inner layer, finally twisting 13 filaments around the inner layer to be an outer layer. The 13 filaments in the outer layer are coated with a ternary alloy coating of copper-cobalt-zinc, the 7 filaments in the inner layer and the 2 filaments in the core layer are coated with brass.

An eleventh embodiment is a 7×19 multi-strand construction. The outer filaments of the outer strands are coated with a ternary alloy coating of copper-zinc-cobalt. The inner filaments of the outer strands may be coated with a ternary alloy coating of copper-zinc-cobalt or with brass or with a zinc coating. The filaments of the inner strands may have a brass coating or a zinc coating. As to the zinc coating, this may be applied by electro-plating or by means of a hot dip operation. On the one hand, the zinc coating may be particularly advantageous for these strands in off-the-road tires as these tires are used in demanding environments with a lot of heat, humidity, presence of dirts and salts . . . . The ternary alloy coating on the outer filaments of the outer strands, on the other hand, may allow the tire makers to remove cobalt from the rubber compounds.

Compared with the prior art steel cord, the invention steel cord saves the amount of M which is an expensive strategic material but without a substantial adhesion performance loss. The adhesion performance of the invention steel cord is not substantially reduced while reducing the number of the filament which is coated with the ternary or quaternary alloy coating of copper-M-zinc. The invention steel cord can be used for reinforcing the cobalt-free rubber product.

Additionally, the cobalt-free rubber has a reduced rubber heat ageing, slower rubber fatigue (slower crack growth rate) and lower rolling resistance because of the absence of cobalt in the rubber compound. Compared with the prior art, the combination of the invention steel cord and the cobalt-free rubber provides a lower cost and a similar lifetime to the rubber product.

The invention claimed is:

1. A steel cord comprising two or more filaments that come in contact with rubber after embedding the steel cord in rubber and filaments that do not come in contact with rubber after embedding the steel cord in rubber, wherein
    at least 50% but less than all of said filaments that come in contact with rubber after embedding the steel cord in rubber are coated with a ternary or quaternary alloy coating of copper-M-zinc,
    said M is one or two metals selected from the group consisting of cobalt, nickel, tin, indium, manganese, iron, bismuth and molybdenum,
    said copper has a content inside said ternary or quaternary alloy coating ranging from 58 weight percent to 75 weight percent,
    said M has a content inside said ternary or quaternary alloy coating ranging from 0.5 weight percent to 10 weight percent,
    a remainder of said ternary or quaternary alloy coating comprises zinc and unavoidable impurities, and
    a remainder of said filaments that are not coated with said ternary or quaternary alloy are coated with brass.

2. The steel cord according to claim 1, wherein said steel cord has a multi-layered structure comprising at least a core layer and an outer layer, said core layer comprising at least one filament and said outer layer comprising a plurality of filaments, at least 50% of said filaments in said outer layer are coated with said ternary or quaternary alloy coating of copper-M-zinc.

3. The steel cord as claimed in claim 2, wherein at least 70% of said filaments in said outer layer are coated with said ternary or quaternary alloy coating of copper-M-zinc.

4. The steel cord as claimed in claim 2, wherein the remainder of said filaments that are not coated with said ternary or quaternary alloy in said outer layer are alternated with said filaments coated with said ternary or quaternary alloy coating of copper-M-zinc.

5. The steel cord as claimed in claim 2, wherein said steel cord further has one or more inner layers comprising a plurality of filaments between said core layer and said outer layer, said filaments in said one or more inner layers are brass coated wires, zinc coated wires, said ternary or quaternary alloy of copper-M-zinc coated wires, uncoated wires or a combination thereof.

6. The steel cord as claimed in claim 1, wherein said steel cord has a multi-layered structure comprising at least a core layer and an outer layer, said core layer comprises at least one filament and said outer layer comprises a plurality of filaments, at least 50% of said filaments in said core layer are coated with said ternary or quaternary alloy coating of copper-M-zinc.

7. The steel cord as claimed in claim 6, wherein all of said filaments in said core layer are coated with said ternary or quaternary alloy coating of copper-M-zinc.

8. The steel cord as claimed in claim 6, wherein said core layer comprises more than one filament, a remainder of filaments that are not coated with said ternary or quaternary alloy in said core layer being alternated with filaments coated with said ternary or quaternary alloy coating of copper-M-zinc.

9. The steel cord as claimed in claim 6, wherein said steel cord has an unsaturated outer layer.

10. The steel cord as claimed in claim 1, wherein said ternary or quaternary alloy coating of copper-M-zinc further comprises phosphorus, triazole or a combination thereof.

11. The steel cord as claimed in claim 1, wherein said steel cord has a structure of 3×1, 4×1, 5×1, 6×1, 7×1, 12×1, 16×1, 19×1, 27×1, 1+5, 1+6, 1+7, 1+8, 2+5, 2+6, 2+7, 2+8, 2+9, 3+5, 3+6, 3+7, 3+8, 3+9, 4+6, 4+7, 4+8, 4+9, 4+10, 1+6+12, 2+7+12, 2+7+13, 3+9+15, 3+9+1, 3+9+15+1.

12. A rubber reinforcement comprising the steel cord as claimed in claim 1.

13. A steel cord comprising two or more filaments, wherein
   at least one but less than all of said two or more filaments is coated with a ternary or quaternary alloy coating of copper-M-zinc,
   said M is one or two metals selected from the group consisting of cobalt, nickel, tin, indium, manganese, iron, bismuth and molybdenum,
   said copper has a content inside said ternary or quaternary alloy coating ranging from 58 weight percent to 75 weight percent,
   said M has a content inside said ternary or quaternary alloy coating ranging from 0.5 weight percent to 10 weight percent,
   a remainder of said ternary or quaternary alloy coating comprises zinc and unavoidable impurities,
   a remainder of said filaments that are not coated with said ternary or quaternary alloy are coated with brass,
   said steel cord has a multi-layered structure comprising at least a core layer and an outer layer, said core layer comprises at least one filament and said outer layer comprises a plurality of filaments, at least 50% of said filaments in said core layer are coated with said ternary or quaternary alloy coating of copper-M-zinc, and
   all of said filaments in said core layer are coated with said ternary or quaternary alloy coating of copper-M-zinc.

14. A steel cord comprising two or more filaments, wherein
   at least one but less than all of said two or more filaments is coated with a ternary or quaternary alloy coating of copper-M-zinc,
   said M is one or two metals selected from the group consisting of cobalt, nickel, tin, indium, manganese, iron, bismuth and molybdenum,
   said copper has a content inside said ternary or quaternary alloy coating ranging from 58 weight percent to 75 weight percent,
   said M has a content inside said ternary or quaternary alloy coating ranging from 0.5 weight percent to 10 weight percent,
   a remainder of said ternary or quaternary alloy coating comprises zinc and unavoidable impurities,
   a remainder of said filaments that are not coated with said ternary or quaternary alloy are coated with brass,
   said steel cord has a multi-layered structure comprising at least a core layer and an outer layer, said core layer comprises at least one filament and said outer layer comprises a plurality of filaments, at least 50% of said filaments in said core layer are coated with said ternary or quaternary alloy coating of copper-M-zinc, and
   said core layer comprises more than one filament, a remainder of filaments that are not coated with said ternary or quaternary alloy in said core layer being alternated with filaments coated with said ternary or quaternary alloy coating of copper-M-zinc.

* * * * *